US009678952B2

(12) United States Patent
Ronin

(10) Patent No.: US 9,678,952 B2
(45) Date of Patent: Jun. 13, 2017

(54) CROSS-LINGUAL E-COMMERCE

(71) Applicant: Ilya Ronin, San Francisco, CA (US)

(72) Inventor: Ilya Ronin, San Francisco, CA (US)

(*) Notice: Subject to any disclaimer, the term of this patent is extended or adjusted under 35 U.S.C. 154(b) by 54 days.

(21) Appl. No.: 14/261,609

(22) Filed: Apr. 25, 2014

(65) Prior Publication Data

US 2014/0372099 A1    Dec. 18, 2014

Related U.S. Application Data

(60) Provisional application No. 61/835,859, filed on Jun. 17, 2013.

(51) Int. Cl.
*G06Q 30/06* (2012.01)
*G06F 17/28* (2006.01)
*G06F 17/30* (2006.01)

(52) U.S. Cl.
CPC ...... *G06F 17/289* (2013.01); *G06F 17/30861* (2013.01); *G06Q 30/06* (2013.01)

(58) Field of Classification Search
CPC .. G06F 17/289; G06F 17/30861; G06Q 30/06
See application file for complete search history.

(56) References Cited

U.S. PATENT DOCUMENTS

| 2001/0029455 A1 | 10/2001 | Chin et al. |
| 2003/0144912 A1 | 7/2003 | McGee |
| 2006/0036567 A1 | 2/2006 | Tan |
| 2007/0078851 A1* | 4/2007 | Grell et al. .................. 707/7 |
| 2009/0024599 A1* | 1/2009 | Tata ..................... G06F 17/275 |
| 2009/0287690 A1* | 11/2009 | Bennett .................. G06F 9/4448 |
| 2012/0109786 A1* | 5/2012 | Platek ..................... G06Q 30/06 705/27.1 |
| 2013/0339378 A1 | 12/2013 | Zheng et al. |

FOREIGN PATENT DOCUMENTS

WO    2012116562 A1    9/2011

OTHER PUBLICATIONS

International Search Report dated Oct. 27, 2014 in corresponding PCT Application No. PCT/US2014/041022.
Written Opinion dated Oct. 27, 2014 in corresponding PCT Application No. PCT/US2014/041022.

* cited by examiner

*Primary Examiner* — Ibrahim Siddo
(74) *Attorney, Agent, or Firm* — Dergosits & Noah LLP; Todd A. Noah

(57) ABSTRACT

Cross-lingual e-commerce is described. A system translates a search query in a first natural language into multiple search queries corresponding to multiple natural languages. The system outputs the search query to an E-commerce website which communicates via the first natural language, and multiple search queries to multiple E-commerce websites which communicates via the corresponding multiple natural languages. The system receives a first search result in the first natural language from the E-commerce website, and multiple search results in the corresponding multiple natural languages from the corresponding multiple E-commerce websites. The system translates the multiple search results into the first language. The system outputs combined search results based on the first search result and multiple translated search results.

18 Claims, 3 Drawing Sheets

CROSS-LINGUAL E-COMMERCE

CLAIM OF PRIORITY

This application claims priority to Provisional U.S. Patent App. No. 61/835,859, filed on Jun. 17, 2013, entitled "WEB-BASED CROSS-LINGUAL E-COMMERCE SOFTWARE APPLICATION" by Ilya Ronin, which is incorporated herein by reference in its entirety and for all purposes.

BACKGROUND

Electronic commerce, commonly known as E-commerce or eCommerce, is a type of industry in which the buying and selling of products and/or services is conducted over electronic systems such as the Internet and other computer networks, drawing on technologies such as mobile commerce, electronic funds transfer, supply chain management, Internet marketing, online transaction processing, electronic data interchange, inventory management systems, and automated data collection systems. E-commerce typically uses the World Wide Web at least at one point in a transaction's life-cycle, although it may encompass a wider range of technologies such as e-mail, mobile devices, social media, and telephones as well. E-commerce is generally considered to be the sales aspect of electronic business, or B-business, and also consists of the exchange of data to facilitate the financing and payment aspects of business transactions.

An online marketplace is a type of E-commerce site in which product and inventory information is provided by multiple third parties, and consumer transactions are processed by a marketplace operator and then delivered and fulfilled by the participating third-party retailers or wholesalers. In general, since online marketplaces aggregate products from a wide array of providers, selection is usually wider, availability is higher, and prices are more competitive than in vendor-specific online retail stores.

DETAILED DESCRIPTION

Embodiments herein enable cross-lingual E-commerce. A search query in a first natural language is translated into multiple search queries corresponding to multiple natural languages. A system outputs the search query to an E-commerce website which communicates via the first natural language, and the multiple search queries to multiple E-commerce websites which communicate via the corresponding multiple natural languages. The system receives a first search result in the first natural language from the E-commerce website, and multiple search results in the corresponding multiple natural languages from the corresponding multiple E-commerce websites. The multiple search results are translated into the first language. The system outputs combined search results based on the first search result and multiple translated search results.

In an example which is described in further detail below in reference to FIGS. 1 and 2, an E-commerce tool receives an English language search query for a Swiss stamp, and uses a translator to translate the English language search query into an Italian language search query, a French language search query, and a German language search query. Then the E-commerce tool outputs the English language search query to English language E-commerce websites, the Italian language search query to Italian language E-commerce websites, the French language search query to French language E-commerce websites, and the German language search query to German language E-commerce websites.

In response to the search queries, the E-commerce tool receives English language search results from the English language E-commerce websites, Italian language search results from the Italian language E-commerce websites, French language search results from the French language E-commerce websites, and German language search results from the German language E-commerce websites. The E-commerce tool then uses the translator to translate the Italian language search results, the French language search results, and the German language search results into English language search results. Then the E-commerce tool outputs combined search results based on the English language search results and the Italian language search results, the French language search results, and the German language search results translated into English language search results. The E-commerce tool enables a user to locate and purchase products and services, such as a Swiss stamp, from E-commerce websites that communicate in natural languages that the user does not understand.

Figure 1:
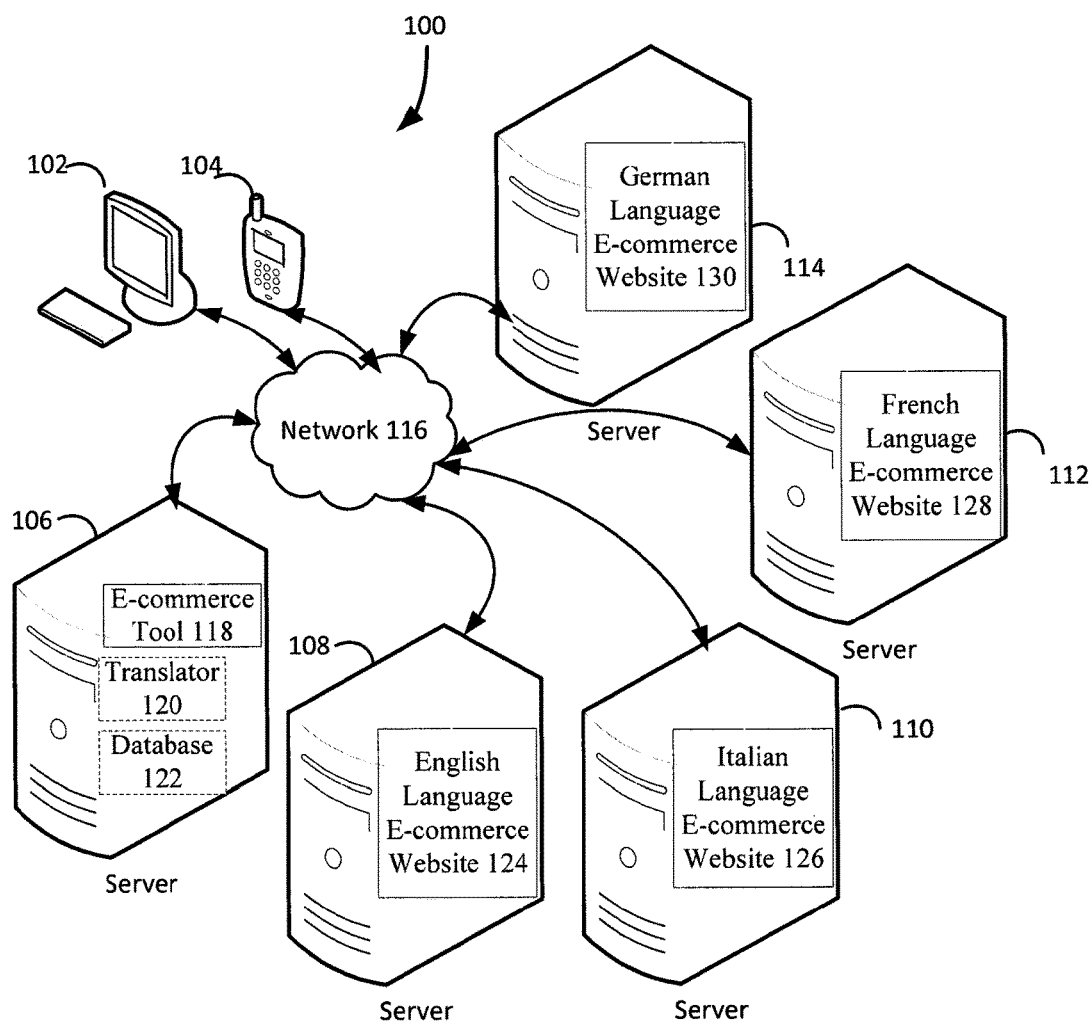
FIG. 1 illustrates a block diagram of an example system for cross-lingual E-commerce, under an embodiment.

FIG. 1 illustrates a block diagram of a system 100 for cross-lingual E-commerce, under an embodiment. As shown in FIG. 1, the system 100 may illustrate a cloud computing environment in which data, applications, services, and other resources are stored and delivered through shared data-centers and appear as a single point of access for the end users. The system 100 may also represent any other type of distributed computer network environment in which servers control the storage and distribution of resources and services for different client users.

In an embodiment, the system 100 represents a cloud computing system that includes a first client 102 and a second client 104, and a first server 106, a second server 108, a third server 110, a fourth server 112, and a fifth server 114 that may be provided by any number of hosting companies. The clients 102-104 and the servers 106-114 communicate via a network 116. The first server 106 includes an E-commerce tool 118, and may include a translator 120 and a database 122. The E-commerce tool 118 enables cross-lingual communication for E-commerce, as described in further detail below. The E-commerce tool 118 may use the translator 120, which provides an internal automated machine translation, or an external automated translation service, to translate cross-lingual communication for E-commerce. The database 122 includes information about sales items, and is updated by multiple external sellers.

The second server 108 supports an English language E-commerce website 124, the third server 110 supports an Italian language E-Commerce website 126, the fourth server 112 supports a French language E-commerce website 128, and the fifth server 114 supports a German language E-commerce website 130. Although FIG. 1 depicts the system 100 with the servers 106-114 supporting E-commerce websites 124-130 that communicate via languages with similar alphabets, the system 100 may also use servers that support E-commerce websites that communicate via languages which use scripts that are quite different from these similar alphabets, such as Chinese, Japanese, and Arabic.

Although FIG. 1 depicts the system 100 with two clients 102-104, five servers 106-114, and one network 116, the system 100 may include any number of clients 102-104, any number of servers 106-114, and/or any number of networks 116. The clients 102-104 and the servers 106-114 may each be substantially similar to the system 300 depicted in FIG. 3 and described below. FIG. 1 depicts the system components 118-122 residing completely on the first server 106, but the system components 112-122 may reside completely on the first server 106, completely on the second server 108, completely on the third server 110, completely on the fourth server 112, completely on the fifth server 114, completely on the clients 102-104, completely on another server that is not depicted in FIG. 1, or in any combination of partially on the servers 106-114, partially on the clients 102-104, and partially on the other server.

The system 100 translates a search query in a first natural language into multiple search queries corresponding to multiple natural languages. For example, the E-commerce tool 118 receives an English language search query for a Swiss stamp, and uses the translator 120 to translate the English language search query into an Italian language search query, a French language search query, and a German language search query. A natural language is used for human communication, and may be spoken, read, or written, and is distinguished from constructed languages such as computer-programming languages.

The system 100 outputs a search query to an E-commerce website which communicates via a first natural language, and multiple search queries to multiple E-commerce websites which communicate via corresponding multiple natural languages. For example, the E-commerce tool 118 outputs the English language search query to the English language E-commerce website 124, the Italian language search query to the Italian language E-commerce website 126, the French language search query to the French language E-commerce website 128, and the German language search query to the German language E-commerce website 130. The E-commerce tool 118 may connect to each of the E-commerce websites 124-130 via application program interfaces. The E-commerce tool 118 may use a web crawler to automatically download webpages from the E-commerce websites 124-130, and determine what type of translation is needed for each of their corresponding webpages, such that the E-commerce tool 118 outputs search queries in the required languages for each of the E-commerce websites 124-130.

The E-commerce tool 118 may also output the English language search query, the Italian language search query, the French language search query, and the German language search query to the database 122, which may use multiple natural languages to include information about items for sale by multiple external sellers. Similarly, if any of the E-commerce websites 124-130 communicates in multiple natural languages, the E-commerce tool 118 is configured to output search queries to such an E-commerce website in all of the natural languages used for communication by the E-commerce website.

The system 100 receives a first search result in a first natural language from an E-commerce website, and multiple search results in corresponding multiple natural languages from corresponding multiple E-commerce websites. For example, the E-commerce tool 118 receives English language search results from the English language E-commerce website 124, Italian language search results from the Italian language E-commerce website 126, French language search results from the French language E-commerce website 128, and German language search results from the German language E-commerce website 130, and multiple language search results from the database 122. The system 100 translates multiple search results into a first language. For example, the E-commerce tool 118 uses the translator 120 to translate the Italian language search results, the French language search results, the German language search results, and the multiple language search results into English language search results.

The system 100 outputs combined search results based on a first search result and multiple translated search results. For example, the E-commerce tool 118 outputs combined search results based on the English language search results and the Italian language search results, the French language search results, the German language search results, and the multiple language search results translated into English language search results. When the E-commerce tool 118 outputs the combined search results, the E-commerce tool 118 may apply any user specified sorting preferences and any user specified filtering preferences to the combined search results, such as sorting by item price in decreasing order, and filtering items to display only the items that are within a certain price range and/or are available from specified countries.

The E-commerce tool 118 may output combined output search results to users without charging the users, while providing advertisements, on a pay by search result basis, and/or on a paid subscription basis. Additionally, the E-commerce websites 124-130 may provide various forms of compensation to an enterprise that provides the E-commerce tool 118 based on the amount of visits that the E-commerce tool 118 directs to the E-commerce websites 124-130, and/or the resulting sales. Furthermore, the E-commerce websites 124-130 may provide various forms of compensation to the enterprise that provides the E-commerce tool 118 based on the E-commerce tool 118 excluding specific competitors of the E-commerce websites 124-130 from the combined search results.

The system 100 may display information about an item in a first natural language in response to a user selection of one of the combined search results corresponding to an item. For example, the E-commerce tool 118 outputs English language information about an item, such as a description, a price, required taxes, a geographic location, currency conversion, and shipping information for the Swiss stamp, in response to a user selecting one of the combined search results for the Swiss stamp. The E-commerce tool 118 modifies all of the hyperlinks in a translated web page in such a way so that if a user selects any of the hyperlinks in the translated web page, each of the subsequent web pages loaded in response to the selected hyperlink are also translated. For example, the E-commerce tool 118 outputs a shopping cart webpage and a checkout webpage in the English language in response to a user interacting with the Italian language E-commerce website 126 to purchase the Swiss stamp.

The system 100 may output messages between potential buyers and potential sellers, and translate these messages as needed. For example, the E-commerce tool 118 uses the translator 120 to translate a request in the English language to provide an enlarged image of the Swiss stamp into the Italian language used for communication by the Italian language E-commerce website 126, and outputs the request to provide an enlarged image of the Swiss stamp, translated into the Italian language, to the Italian language E-commerce website 126. Continuing this example, the E-commerce tool 118 uses the translator 120 to translate a response in the Italian language that provides an enlarged image of the Swiss stamp into the English language, and outputs the translated response in the English language that provides an enlarged image of the Swiss stamp to the client 102.

The E-commerce tool 118 enables a user to locate and purchase products and services, such as a Swiss stamp, from the E-commerce websites 126-130 that communicate in natural languages that the user does not understand. The E-commerce tool 118 may also provide such searching and translating services for other websites' search engines.

Figure 2:
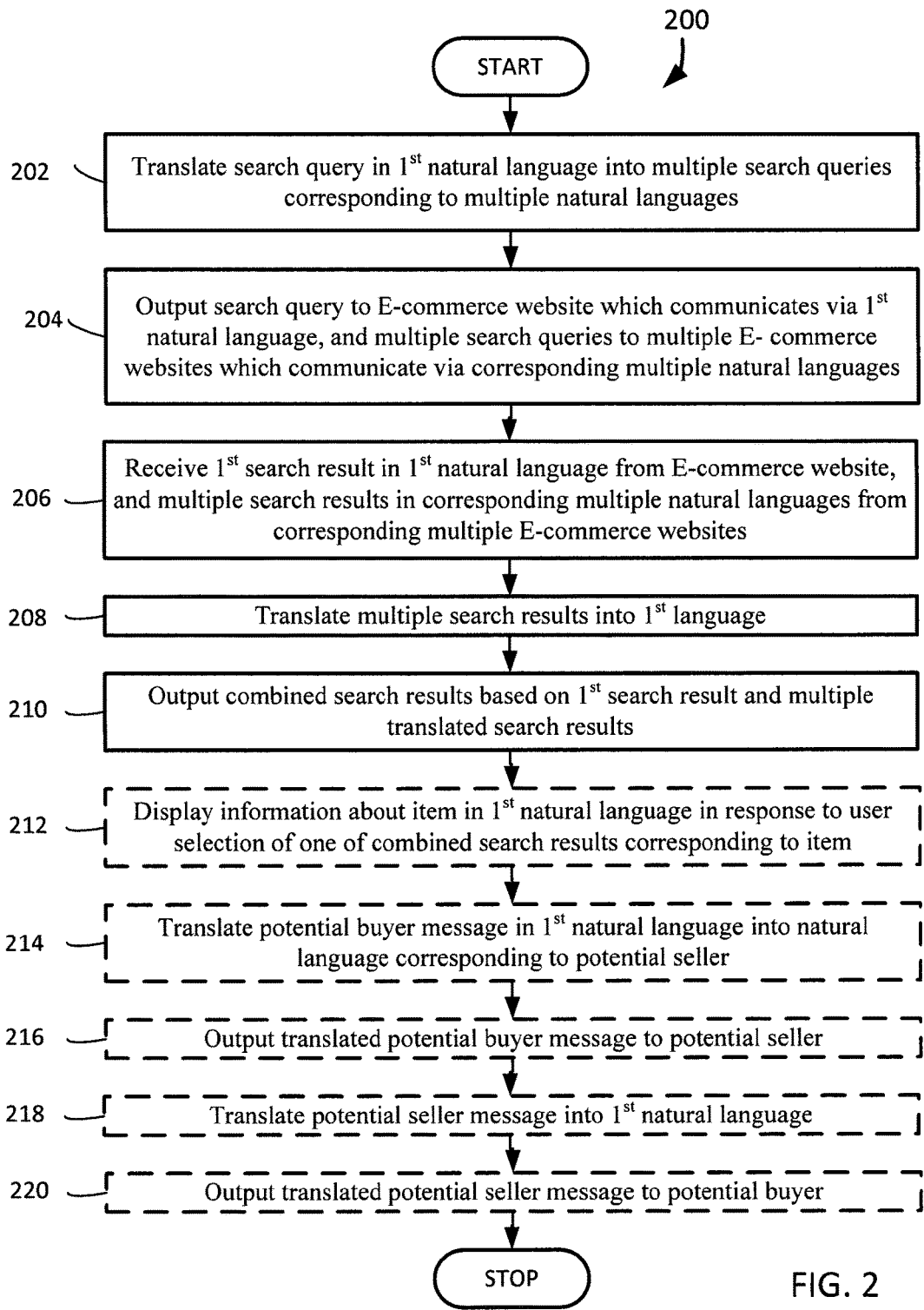
FIG. 2 is a flowchart that illustrates a method for cross-lingual E-commerce, under an embodiment.

FIG. 2 is a flowchart that illustrates a method for cross-lingual E-commerce, under an embodiment. Flowchart 200 illustrates method acts illustrated as flowchart blocks for certain steps involved in and/or between the clients 102-104 and/or the servers 106-114 of FIG. 1.

A search query in a first natural language is translated into multiple search queries corresponding to multiple natural languages, block 202. For example and without limitation, this may include the E-commerce tool 118 receiving an English language search query for a Swiss stamp, and using the translator 120 to translate the English language search query into an Italian language search query, a French language search query, and a German language search query.

A search query is output to an E-commerce website which communicates via a first natural language, and multiple search queries are output to multiple E-commerce websites which communicates via corresponding multiple natural languages, block 204. By way of example and without limitation, this may include the E-commerce tool 118 outputting the English language search query to the English language E-commerce website 124, the Italian language search query to the Italian language E-commerce website 126, the French language search query to the French language E-commerce website 128, and the German language search query to the German language E-commerce website 130.

A first search result in a first natural language is received from an E-commerce website, and multiple search results in corresponding multiple natural languages are received from corresponding multiple E-commerce websites, block 206. In embodiments, this may include the E-commerce tool 118 receiving English language search results from the English language E-commerce website 124, Italian language search results from the Italian language E-commerce website 126, French language search results from the French language E-commerce website 128, and German language search results from the German language E-commerce website 130.

Multiple search results are translated into a first language, block 208. For example and without limitation, this may include the E-commerce tool 118 using the translator 120 to translate the Italian language search results, the French language search results, and the German language search results into English language search results.

Combined search results are output based on a first search result and multiple translated search results, block 210. By way of example and without limitation, this may include the E-commerce tool 118 outputting combined search results based on the English language search results and the Italian language search results, the French language search results, and the German language search results translated into English language search results.

Information about an item is optionally displayed in a first natural language in response to a user selection of one of the combined search results corresponding to an item, block 212. In embodiments, this may include the E-commerce tool 118 outputting a shopping cart webpage and a checkout webpage in the English language in response to a user selecting one of the combined search results and interacting with the Italian language E-commerce website 126 to purchase the Swiss stamp.

A potential buyer message in a first natural language is optionally translated into a natural language corresponding to a potential seller, block 214. For example and without limitation, this may include the E-commerce tool 118 using the translator 120 to translate a request in the English language to provide an enlarged image of the Swiss stamp into the Italian language.

A translated potential buyer message is optionally output to a potential seller, block 216. By way of example and without limitation, this may include the E-commerce tool 118 outputting the request translated into the Italian language to provide an enlarged image of the Swiss stamp.

A potential seller message is optionally translated into a first natural language, block 218. In embodiments, this may include the E-commerce tool 118 using the translator 120 to translate a response in the Italian language that provides an enlarged image of the Swiss stamp into the English language.

A translated potential seller message is optionally output to a potential buyer, block 220. For example and without limitation, this may include the E-commerce tool 118 outputting the translated response in the English language that provides an enlarged image of the Swiss stamp.

The E-commerce tool 118 enables a user to locate and purchase products and services, such as a Swiss stamp, from the E-commerce websites 126-130 that communicate in natural languages that the user does not understand. Although FIG. 2 depicts the blocks 202-220 occurring in a specific order, the blocks 202-220 may occur in another order. In other implementations, each of the blocks 202-220 may also be executed in combination with other blocks and/or some blocks may be divided into a different set of blocks.

Figure 3:
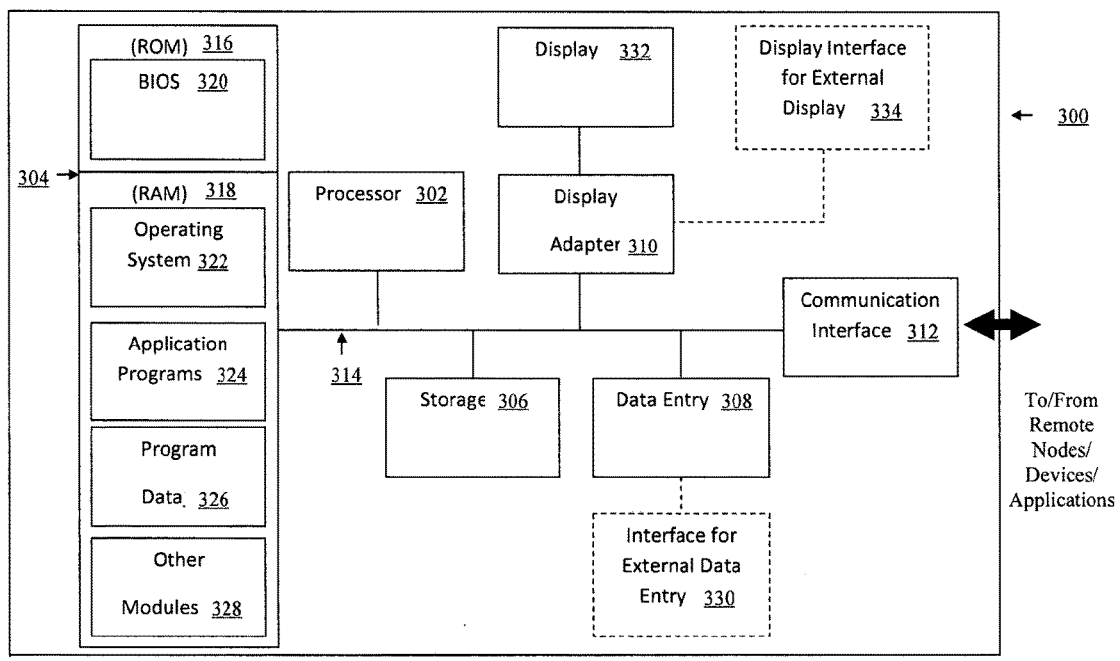
FIG. 3 is a block diagram illustrating an example hardware device in which the subject matter may be implemented.

An exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, a memory 304, a storage 306, a data entry module 308, a display adapter 310, a communication interface 312, and a bus 314 that couples elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include a read only memory (ROM) 316 and a random access memory (RAM) 318. The memory 304 may be configured to store program instructions and data during operation of the device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which may store data that is accessible by a computer, such as magnetic cassettes, flash memory cards, digital video disks, Bernoulli cartridges, RAM, ROM, and the like may also be used in the exemplary operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the device 300 and to deliver such input to the processing unit 302 and/or the memory 304 via the bus 314.

A display 332 is also connected to the bus 314 via the display adapter 310. The display 332 may be configured to display output of the device 300 to one or more users. In some embodiments, a given device such as a touch screen, for example, may function as both the data entry module 308 and the display 332. External display devices may also be connected to the bus 314 via the external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for cross-lingual e-commerce, the system comprising:
one or more processors; and
    a non-transitory computer readable medium storing a plurality of instructions, which when executed, cause the one or more processors to:
    identify, by an application hosted by a server computer, a plurality of electronic commerce websites in response to a query from a client computer;
    identify, by the application, a plurality of natural languages corresponding to the identified plurality of electronic commerce websites;
    translate, by the application, a search query in a first natural language into a plurality of search queries corresponding to the plurality of natural languages corresponding to the identified plurality of electronic commerce websites;
    output, by the application, the search query to an electronic commerce website which communicates via the first natural language, and each of the plurality of search queries to a corresponding one of the identified plurality of electronic commerce websites which communicate via the corresponding plurality of natural languages;
    receive, by the application, a first search result in the first natural language from the electronic commerce website, and a plurality of search results in each of the corresponding plurality of natural languages from the corresponding one of the identified plurality of electronic commerce websites;
    translate, by the application, the plurality of search results into the first language;
    output, by the application, combined search results in the first language based on the first search result and at least one of a plurality of translated search results; and
    modify, by the application, all hyperlinks in the translated search result, such that the selection of any of the hyperlinks by a user will cause a web page linked to the selected hyperlink to be translated into the first language.

2. The system of claim 1, wherein translating is provided by at least one of an internal automated machine translation and an external automated translation service.

3. The system of claim 1, wherein the plurality of electronic commerce websites comprises an internal database of information about sales items which is updated by a plurality of external sellers.

4. The system of claim 1, wherein outputting the plurality of search queries to the plurality of electronic commerce websites comprises outputting a set of search queries to one of the plurality of electronic commerce websites which communicates via a corresponding set of natural languages.

5. The system of claim 1, wherein outputting the combined search results comprises applying any user specified sorting preferences and any user specified filtering preferences to the combined search results.

6. The system of claim 1, wherein the instructions, when executed, further cause the one or more processors to:
    translate, by the application, a potential buyer message in the first natural language into a natural language corresponding to a potential seller;
    output, by the application, a translated potential buyer message to the potential seller;
    translate, by the application, a potential seller message into the first natural language; and
    output, by the application, a translated potential seller message to the potential buyer.

7. A computer-implemented method for cross-lingual e-commerce, the method comprising:
    identifying, by an application hosted by a server computer, a plurality of electronic commerce websites in response to a query from a client computer;
    identifying, by the application, a plurality of natural languages corresponding to the identified plurality of electronic commerce websites;
    translating, by the application, a search query in a first natural language into a plurality of search queries corresponding to the plurality of natural languages corresponding to the identified plurality of electronic commerce websites;
    outputting, by the application, the search query to an electronic commerce website which communicates via the first natural language, and each of the plurality of search queries to a corresponding one of the identified plurality of electronic commerce websites which communicate via the corresponding plurality of natural languages;
    receiving, by the application, a first search result in the first natural language from the electronic commerce website, and a plurality of search results in each of the corresponding plurality of natural languages from the corresponding one of the identified plurality of electronic commerce websites;

translating, by the application, the plurality of search results into the first language;

outputting, by the application, combined search results in the first language based on the first search result and at least one of a plurality of translated search results; and modifying, by the application, all hyperlinks in the translated search result, such that the selection of any of the hyperlinks by a user will cause a web page linked to the selected hyperlink to be translated into the first language.

8. The method of claim 7, wherein translating is provided by at least one of an internal automated machine translation and an external automated translation service.

9. The method of claim 7, wherein the plurality of electronic commerce websites comprises an internal database of information about sales items which is updated by a plurality of external sellers.

10. The method of claim 7, wherein outputting the plurality of search queries to the plurality of electronic commerce websites comprises outputting a set of search queries to one of the plurality of electronic commerce websites which communicates via a corresponding set of natural languages.

11. The method of claim 7, wherein outputting the combined search results comprises applying any user specified sorting preferences and any user specified filtering preferences to the combined search results.

12. The method of claim 7, wherein the method further comprises:

translating, by the application, a potential buyer message in the first natural language into a natural language corresponding to a potential seller;

outputting, by the application, a translated potential buyer message to the potential seller;

translating, by the application, a potential seller message into the first natural language; and outputting, by the application, a translated potential seller message to the potential buyer.

13. A computer program product, comprising a non-transitory computer-readable medium having a computer-readable program code embodied therein to be executed by one or more processors, the program code including instructions to:

identify, by an application hosted by a server computer, a plurality of electronic commerce websites in response to a query from a client computer;

identify, by the application, a plurality of natural languages corresponding to the identified plurality of electronic commerce websites;

translate, by the application, a search query in a first natural language into a plurality of search queries corresponding to the plurality of natural languages corresponding to the identified plurality of electronic commerce websites;

output, by the application, the search query to an electronic commerce website which communicates via the first natural language, and each of the plurality of search queries to a corresponding one of the identified plurality of electronic commerce websites which communicate via the corresponding plurality of natural languages;

receive, by the application, a first search result in the first natural language from the electronic commerce website, and a plurality of search results in each of the corresponding plurality of natural languages from the corresponding one of the identified plurality of electronic commerce websites;

translate, by the application, the plurality of search results into the first language;

output, by the application, combined search results in the first language based on the first search result and at least one of a plurality of translated search results; and modify, by the application, all hyperlinks in the translated search result, such that the selection of any of the hyperlinks by a user will cause a web page linked to the selected hyperlink to be translated into the first language.

14. The computer program product of claim 13, wherein translating is provided by at least one of an internal automated machine translation and an external automated translation service.

15. The computer program product of claim 13, wherein the plurality of electronic commerce websites comprises an internal database of information about sales items which is updated by a plurality of external sellers.

16. The computer program product of claim 13, wherein outputting the plurality of search queries to the plurality of electronic commerce websites comprises outputting a set of search queries to one of the plurality of electronic commerce websites which communicates via a corresponding set of natural languages.

17. The computer program product of claim 13, wherein outputting the combined search results comprises applying any user specified sorting preferences and any user specified filtering preferences to the combined search results.

18. The computer program product of claim 13, wherein the program code includes further instructions to:

translate, by the application, a potential buyer message in the first natural language into a natural language corresponding to a potential seller;

output, by the application, a translated potential buyer message to the potential seller;

translate, by the application, a potential seller message into the first natural language; and output, by the application, a translated potential seller message to the potential buyer.

* * * * *